(No Model.)  3 Sheets—Sheet 1.
T. M. MURPHY.
SPRINKLER.

No. 366,974. Patented July 19, 1887.

Witnesses
Chas. J. Williamson.
Henry C. Hazard.

Inventor
Thomas M. Murphy
by Prindle and Russell
his Attorneys (No Model.) 3 Sheets—Sheet 2.

T. M. MURPHY.
SPRINKLER.

No. 366,974. Patented July 19, 1887.

Witnesses
Chas. J. Williamson
Henry C. Hazard

Inventor
Thomas M. Murphy
by Prindle and Russell
his Attorneys (No Model.) 3 Sheets—Sheet 3.

T. M. MURPHY.
SPRINKLER.

No. 366,974. Patented July 19, 1887.

Witnesses
Chas. J. Williamson.
Henry C. Hazard.

Inventor
Thomas M. Murphy
by Purnell and Russell
his Attorneys

UNITED STATES PATENT OFFICE.

THOMAS M. MURPHY, OF ST. LOUIS, MISSOURI, ASSIGNOR, BY MESNE ASSIGNMENTS, TO SAID THOMAS M. MURPHY, TRUSTEE.

SPRINKLER.

SPECIFICATION forming part of Letters Patent No. 366,974, dated July 19, 1887.

Application filed March 16, 1887. Serial No. 231,163. (No model.)

*To all whom it may concern:*

Be it known that I, THOMAS M. MURPHY, of St. Louis, in the former county of St. Louis, and in the State of Missouri, have invented certain new and useful Improvements in Sprinklers; and I do hereby declare that the following is a full, clear, and exact description thereof, reference being had to the accompanying drawings, in which—

Figure 1:
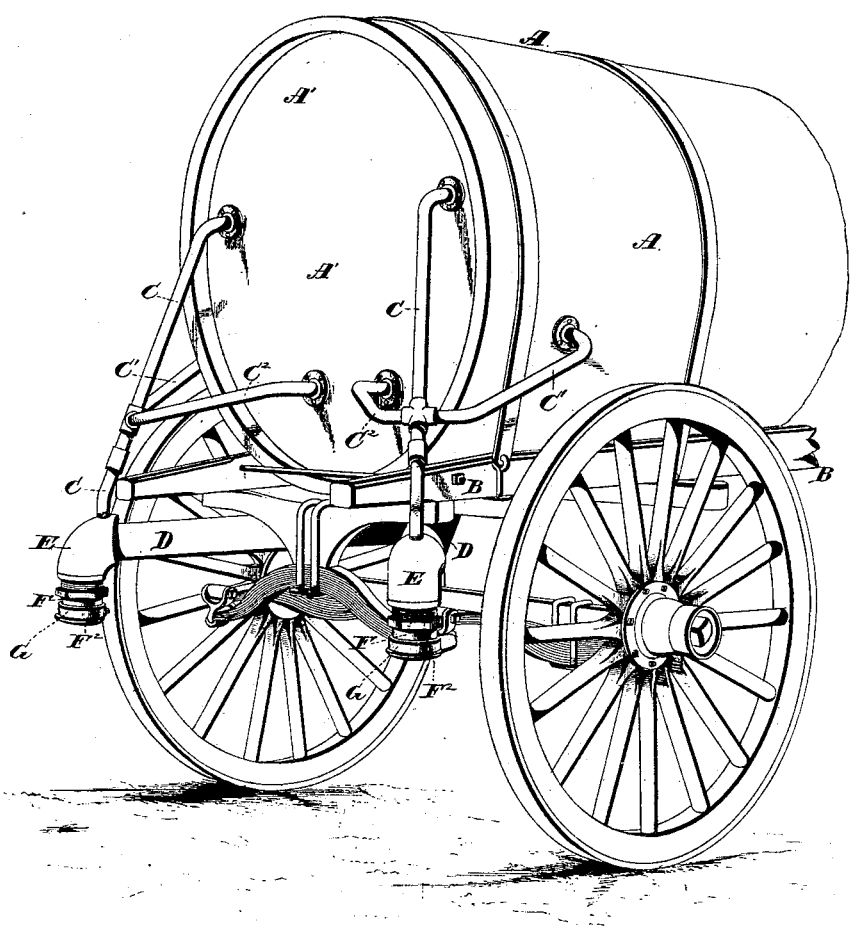
Figure 2:
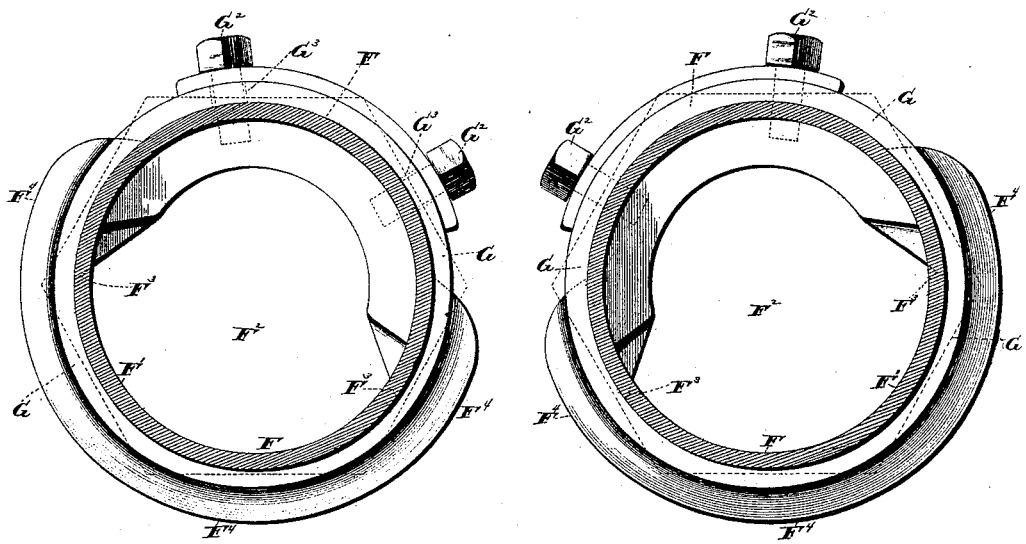
Figure 3:
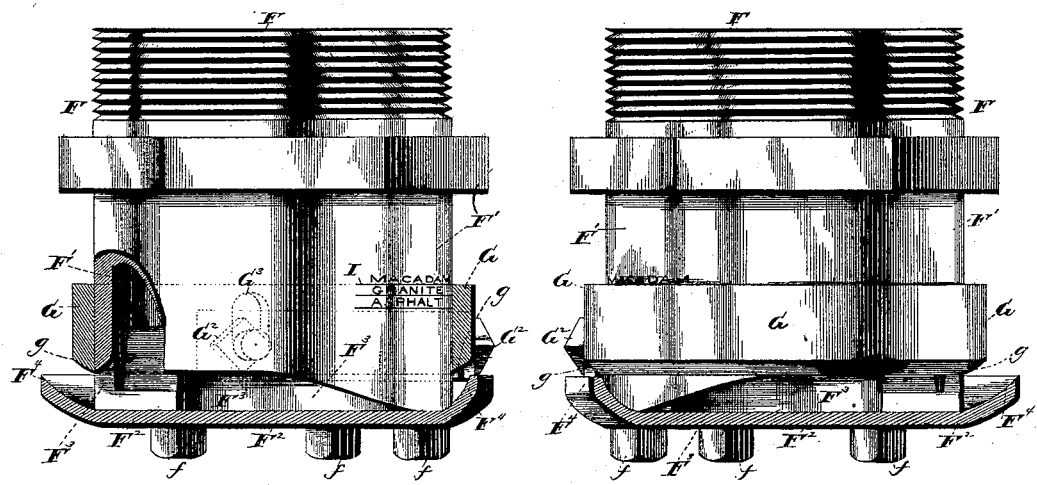
Figure 4:
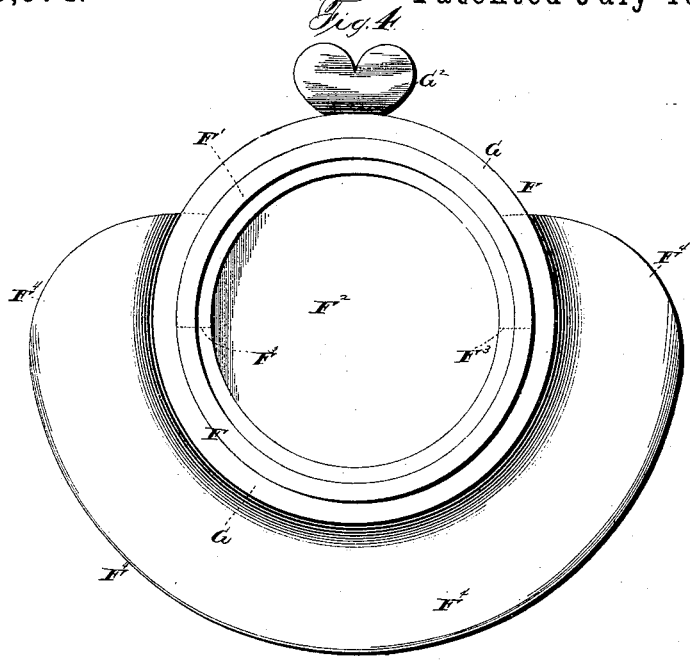
Figure 5:
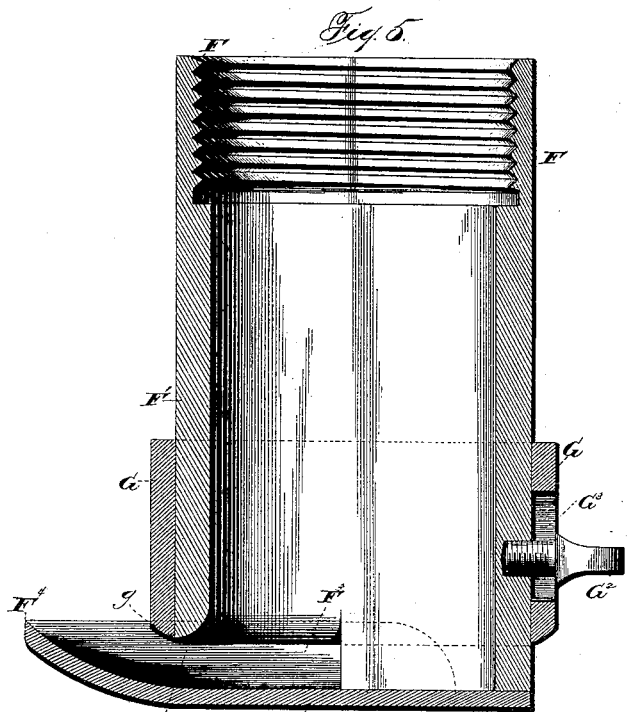

Figure 1 shows a perspective view of the rear portion of a watering-cart provided with my sprinkling-nozzles; Fig. 2, a detail horizontal sectional view of the two nozzles, as arranged in Fig. 1; Fig. 3, a view in rear elevation of said nozzles, parts being shown in section; Fig. 4, a detail plan view of a form of nozzle adapted to be used singly, and Fig. 5 a vertical sectional view of the same on line $x\ x$ of Fig. 4.

Letters of like name and kind refer to like parts in each of the figures.

The object of my invention is to provide an improvement in sprinkling or spraying devices, and in the combination of the same with a watering or sprinkling cart; and to this end my invention consists in the sprinkling devices, the construction, arrangement, and combination of the parts thereof, and in the manner and means of connecting such devices with a sprinkling-cart, substantially as and for the purpose hereinafter described.

My sprinkling or spraying devices will be shown and described as particularly adapted for use on a watering or sprinkling cart for street-watering; but I do not limit myself to such use of them. As will be seen, they are also adapted for use for various other purposes wherever a free and even sprinkling or spraying of any liquid is desired.

In the drawings, A designates the rear portion of the body or tank of a watering-cart, which can be supported in any desired way upon the frame B of the cart. Heretofore it has been customary, in making watering or sprinkling carts, to have the sprinkling devices, which are connected by suitable pipes with the tank, supported upon the frame of the cart. With this construction, when there was any play between the frame of the cart and the body or tank, as there was bound to be when the tank was filled and the cart was driven along the streets, the joints or couplings in the pipe or pipes connecting the sprinkler and the tank would become strained, racked, and made leaky. To avoid this objection, I do not support my sprinkling or spraying devices or their connections with the tank or body from the cart-frame, but from such tank or body itself, so that such devices and connections will move with the body in all its movements or play on the cart-frame.

In the drawings I show the sprinkling or spraying devices, which will be described more fully in detail hereinafter, each supported by a bracket or frame attached to and extending down from the end of the tank or body A. Each of these brackets or frames is preferably made of tubular material, and consists, essentially, of the arm C, attached at its upper end to the end or head A' of the tank and extending downward, rearward, and slightly outward, as shown. For steadying and bracing this arm I provide the arm or brace C', attached to the side of the tank near the end of the latter, and extending rearward and downward and inward, with its rear end attached to arm C, and the brace C², attached to head or end A' of the tank, extending rearward and outward, and at its rear end attached to arm C.

The sprinkling or spraying devices are supported upon the lower ends of the arms C C below the points of attachment of braces C' C² to said arms.

The pipes D D, connecting at their forward ends with the interior of the tank or body A at its bottom, run rearward and outward to the angle-couplings E E, which couplings are shown as fastened directly to the lower ends of the supporting-arms C C. Into these angle-couplings are screwed the dependent nozzles F F. Each one of these nozzles consists, essentially, of the main hollow portion F', preferably cylindrical in shape, as shown in the drawings, and the plate F², closing the lower end of the cylindrical main portion. Such plate can be fastened in place in any desirable way; but I show it as secured to the main body of the nozzle by means of screws $f\ f\ f$. On one side the lower end of the cylindrical portion F' is cut away, so as to leave an elongated opening or slot, F³, whose lower side is formed by the upper surface of plate F². Said plate is provided with a lip or flange, F⁴, projecting outward beyond the sides of the main portion F' and extending around the plate from a point well beyond one end of the slot F³ to a point well beyond the other end of the same. The lip or flange is, as shown, inclined upward and outward on its upper face, and such face is preferably concaved slightly, so as to give the lip a concave upward and outward bevel.

The water flowing through pipes D D passes down and out through the slots F³ F³, and, striking the lips F⁴ F⁴, is thereby directed upward and outward and passes in a thin, even, and continuous sheet over and off of the outer edges of the lips, which are preferably, as shown in the drawings, curved in arcs of circles concentric with the cylindrical portions F' F' of the nozzles.

To facilitate the free flow of the liquid from within out through the slots, the upper edges of the latter are beveled or rounded on their inner sides.

To regulate the amount of liquid flowing through the slots, each of the nozzles is provided with the ring G, encircling the main portion or body F' of the nozzle, and adapted to be adjusted up and down thereon, so as to raise its lower edge up to the upper edge of the slot and lower it down over the slot to partially or entirely close the same.

The outer side of the lower end of each of the rings G G is preferably beveled or rounded, as shown at $g$, so as not to obstruct the upward and outward flow of the liquid over the upper face of lip F⁴, after such liquid has issued from the slot F³ and passed the lowest inner edge, $g'$, of the ring. With this construction, and the upper side of the slot and lower end of the ring G beveled as described, the water or other liquid passes sharp edges, which present the least possible obstruction to the free flow of the liquid.

For allowing the desired adjustment of the rings G G and providing for fixing them at any adjustment, I use one or more screws, G² G², each passing through an upright slot, G³, in the respective ring and tapped into the body of the nozzle. Upon loosening these screws the rings can be slid up or down as desired and then fastened as moved by tightening up the screws again.

Where the two sprinkling or spraying nozzles are used, as already described, they are turned so that the slots at the lower ends face toward the rear and outward, as shown clearly in Figs. 2 and 3 of the drawings, and the thin sheets of water issuing from the slots will overlap each other at their inner sides. In order that such overlapping of the streams or sheets of water issuing from the inner ends of the slots may not make the amount of water falling on the surface over which the space between the nozzles passes as the cart moves along greater than the amount delivered on other parts of the surface being watered, the inner ends of the slots are, as shown, tapered down or made narrower than the main portions of the slots. With this construction, an even delivery of water and equal wetting or sprinkling is secured throughout the whole spread of the water from the two nozzles, and no portions of the sprinkled surface between the outer limits reached by the water from the two nozzles are either unwet or more wet than others. The two nozzles, arranged and operating as described, are desirable where the streets of a city are to be watered, as it is then often necessary in passing vehicles or obstructions to shut off the water on one side or the other temporarily and turn it on again. By proper valves in the pipes D D this can be done at will by the driver through any desirable valve-operating devices within his reach and control. Where this shutting off or checking of one side of the sheet of water as delivered is not desired, I propose to use the form of nozzle shown in Figs. 4 and 5, which is adapted for use by itself without an accompanying nozzle. It is in construction like the nozzles already described, except that its slot F³ is made of the same size or diameter throughout, so as to deliver a sheet of water of the same thickness throughout its entire extent. This nozzle, where used, is set centrally in the rear of the cart, and with the slot F³, extending, as shown, well around to its opposite sides, will discharge a continuous and unbroken thin sheet of water directly out beyond the opposite sides of the cart to a distance substantially equal to that to which the water is thrown to the rear.

By sliding the adjusting-ring G on either form of nozzle used, down or up, the thickness of the sheet of water delivered from the slot F³ over the lip F⁴ can be diminished or increased without lessening the spread or distance to which the water is thrown. The amount of wetting of the surface being watered can thus be changed at will without diminishing or increasing the space which is wet.

With the sprinkling-carts as heretofore made and used, the flow of water through the sprinkler has been regulated by means of a valve in the pipe leading from the tank to said sprinkler. As the openings through which the water issued from the latter remained of the same size, if the amount of water flowing to the sprinkler in a given time was lessened by means of the valve, the only result was to diminish the spread of the streams from openings, and so narrow the space watered, while not lessening materially the amount of wetting of the narrower space within the reach of the streams. In other words, with the sprinklers as heretofore used, the amount of wetting of surface could not be changed without change of the space watered. With my nozzle, on the other hand, as the rate of flow of water to the nozzle is not changed, but the size of the discharge-opening is, the amount of water flowing from the opening can be lessened as desired without lessening the throw of such water and the width of the space wet.

The width of the watered space remaining substantially the same, the amount of water delivered upon it can be regulated at will.

As different kinds of pavement need different degrees of wetting, I contemplate, for convenience, placing a graduated scale, I, on the body of each nozzle F, the division-lines of which scale are so situated as to indicate the proper positions of the upper edge of the ring G when such ring has been moved to regulate the thickness of the stream or sheet of water requisite for the proper wetting of the different kinds of pavement. As asphalt pavement needs the least wetting, I have marked the lowest line "asphalt," the next "granite," and the top one "macadam," as the macadam pavement needs the most wetting. Such scale is of course not necessary, and can be dispensed with, as desired.

By having the water issue from the nozzle through a slot, instead of through a series of small openings, as heretofore, I largely increase the amount of surface that can be covered under a given head, for there is obviously much less frictional surface in contact with the particles of water than if all such particles had to issue through a series of small holes. With the slot the frictional surface is only in contact with the upper and lower sides and ends of the sheet of water, while with the series of holes or openings each small stream of water must be in contact with the edges of its respective opening all around.

I have found by actual test that with the two nozzles arranged as shown and described, I get an even spread of the water over a space thirty-five feet wide, while with the same head and with the old perforated form of sprinkler only sixteen to twenty feet spread can be obtained.

With the slotted nozzle a far more even spreading of the water is obtained than is possible where the wetting is done by a series of separate streams issuing from separate orifices.

It is essential where even spraying is required that the lip F¹ be continued at each end thereof well around beyond the ends of the slot F³, so that the water issuing from the slot will flow outward over the outer edge of the lip. If the ends of the lip or flange are too near the ends of the slot, some of the water at the sides of the sheet will flow over such ends and run down.

I do not limit myself in the use of my sprinkling or spraying nozzle to watering-carts and wetting streets, as such nozzle is applicable for many other purposes wherever an even and thorough spraying or sprinkling is desired.

Having thus described my invention, what I claim is—

1. A sprinkling or spraying nozzle having the slot through which the liquid issues, and the lip extending out from such slot so as to form a continuation of the lower or outer slot edge, and around beyond the ends of the slot, substantially as and for the purpose specified.

2. A nozzle having the slot and the concave spreading lip extending out from such slot so as to form a continuation of the lower edge thereof, and with its ends beyond the ends of the slot, substantially as and for the purpose described.

3. In combination with the main body of the nozzle cut away at its end at one side, the plate against the end of the body provided with the lip or flange extending out from the cut-away part of the body, and at its ends reaching beyond the ends of the cut, substantially as and for the purpose specified.

4. In combination with the nozzle provided with the slot in its side and the distributing-lip, the adjustable ring on the body adapted to be moved over the slot toward and from the distributing-lip, and means for fixing it at any desired adjustment, substantially as and for the purpose specified.

5. In combination with the body or tank of a watering-cart, the nozzle having the horizontal slot, and provided with a lip extending outward and upward from the lower side of the slot and around beyond the end of the same, substantially as and for the purpose set forth.

6. In combination with the body or tank of a watering cart, the two nozzles having the slots for the passage of the water in sheets, the inner or contiguous ends of which slots are tapered or made smaller than the rest of the slots, substantially as and for the purpose specified.

7. In combination with the body or tank of a watering-cart, the two nozzles, each provided with a horizontal slot tapered or made narrower at its end which is toward the other nozzle, and with the distributing-lip extending out from the lower side of the slot and at its ends reaching beyond the slot ends, substantially as and for the purpose shown.

In testimony that I claim the foregoing I have hereunto set my hand this 12th day of March, A. D. 1887.

THOMAS M. MURPHY.

Witnesses:
LOUIS H. TONTRUP,
HENRY W. YERKE.